US007890751B1

(12) United States Patent
Morris et al.

(10) Patent No.: US 7,890,751 B1
(45) Date of Patent: Feb. 15, 2011

(54) METHOD AND SYSTEM FOR INCREASING DATA ACCESS IN A SECURE SOCKET LAYER NETWORK ENVIRONMENT

(75) Inventors: Brian C. Morris, Austin, TX (US); Scott P. Hertzog, Round Rock, TX (US); Thomas P. Yohe, Dayton, OH (US)

(73) Assignee: Comtech EF Data Corp, Tempe, AZ (US)

( * ) Notice: Subject to any disclaimer, the term of this patent is extended or adjusted under 35 U.S.C. 154(b) by 998 days.

(21) Appl. No.: 10/727,291

(22) Filed: Dec. 3, 2003

(51) Int. Cl.
*H04L 9/00* (2006.01)
(52) U.S. Cl. .......................... 713/156; 726/12
(58) Field of Classification Search ........................ None
See application file for complete search history.

(56) References Cited

U.S. PATENT DOCUMENTS

| | | | |
|---|---|---|---|
| 6,081,900 A * | 6/2000 | Subramaniam et al. | 726/19 |
| 6,223,287 B1 | 4/2001 | Douglas et al. | |
| 6,286,104 B1 * | 9/2001 | Buhle et al. | 726/4 |
| 6,367,009 B1 * | 4/2002 | Davis et al. | 713/166 |
| 6,584,567 B1 * | 6/2003 | Bellwood et al. | 713/171 |
| 6,643,701 B1 * | 11/2003 | Aziz et al. | 709/227 |
| 6,874,084 B1 * | 3/2005 | Dobner et al. | 713/156 |
| 6,874,089 B2 * | 3/2005 | Dick et al. | 726/14 |
| 6,983,382 B1 * | 1/2006 | Hartke et al. | 726/4 |
| 7,013,387 B2 * | 3/2006 | Cihula | 713/153 |
| 7,043,632 B2 * | 5/2006 | Chapman et al. | 713/153 |
| 7,149,892 B2 * | 12/2006 | Freed et al. | 713/151 |
| 7,228,412 B2 * | 6/2007 | Freed et al. | 713/153 |
| 2002/0099957 A1 | 7/2002 | Kramer et al. | |
| 2002/0152382 A1 | 10/2002 | Xiao | |
| 2002/0161834 A1 | 10/2002 | Rescorla et al. | |
| 2003/0014625 A1* | 1/2003 | Freed et al. | 713/153 |
| 2003/0014628 A1* | 1/2003 | Freed et al. | 713/155 |
| 2003/0014650 A1 | 1/2003 | Freed et al. | |
| 2003/0018891 A1* | 1/2003 | Hall et al. | 713/160 |
| 2003/0028646 A1 | 2/2003 | Wray | |
| 2003/0033520 A1 | 2/2003 | Peiffer et al. | |
| 2003/0046532 A1* | 3/2003 | Gast | 713/151 |
| 2003/0091023 A1 | 5/2003 | Gambino | |
| 2003/0093573 A1 | 5/2003 | Gambino | |
| 2003/0105953 A1* | 6/2003 | Brabson et al. | 713/151 |
| 2003/0105977 A1 | 6/2003 | Brabson et al. | |
| 2003/0112772 A1* | 6/2003 | Chatterjee et al. | 370/316 |
| 2003/0142818 A1* | 7/2003 | Raghunathan et al. | 380/1 |
| 2003/0149889 A1* | 8/2003 | Wookey et al. | 713/200 |

(Continued)

OTHER PUBLICATIONS

Alan O. Freier, Philip Karlton, Paul C. Kocher, The SSL Protocol, Version 3.0, Internet Draft, Mar. 1996, 54 total pages.

*Primary Examiner*—Michael Pyzocha
*Assistant Examiner*—Jeffery Williams
(74) *Attorney, Agent, or Firm*—R. William Graham

(57) ABSTRACT

A system for increasing data access in a secure socket layer network environment includes a web server computer having SSL acceleration server software (SSLAS) and a client computer communicatively linked to the web server computer having SSL acceleration client software operably associated with the client computer which communicates with the SSLAS software to receive a copy of a pseudo CA certificate and a public key from the SSLAS software and present the pseudo CA certificate to web browser software on the client computer for validation thereof.

9 Claims, 4 Drawing Sheets

U.S. PATENT DOCUMENTS

| | | |
|---|---|---|
| 2003/0167403 A1 | 9/2003 | McCurley et al. |
| 2003/0182423 A1* | 9/2003 | Shafir et al. .................. 709/225 |
| 2003/0233539 A1* | 12/2003 | Tardo et al. .................. 713/153 |
| 2004/0123096 A1* | 6/2004 | Buer et al. .................. 713/153 |
| 2004/0210756 A1* | 10/2004 | Mowers et al. .............. 713/168 |
| 2004/0243835 A1* | 12/2004 | Terzis et al. .................. 713/200 |
| 2005/0108518 A1* | 5/2005 | Pandya ....................... 713/151 |
| 2005/0177866 A1* | 8/2005 | Kirsch ........................... 726/3 |
| 2005/0210243 A1* | 9/2005 | Archard et al. ............... 713/160 |
| 2006/0020783 A1* | 1/2006 | Fisher ......................... 713/156 |
| 2006/0149962 A1* | 7/2006 | Fountain et al. .............. 713/151 |
| 2006/0179298 A1* | 8/2006 | Balaz et al. .................. 713/156 |
| 2006/0190717 A1* | 8/2006 | Ohhira ........................ 713/153 |
| 2008/0046714 A1* | 2/2008 | Suganthi et al. ............. 713/150 |
| 2008/0307219 A1* | 12/2008 | Karandikar .................. 713/153 |

* cited by examiner

METHOD AND SYSTEM FOR INCREASING DATA ACCESS IN A SECURE SOCKET LAYER NETWORK ENVIRONMENT

BACKGROUND OF THE INVENTION

1. Field of the Invention

The present invention relates to the transfer of data over a Secure Socket Layer (SSL). More particularly, the invention is directed to a method and system for increasing data access in a secure socket layer network environment.

2. Description of the Prior Art

The Secure Socket Layer (SSL) protocol (see The SSL Protocol Version 3.0, http://www.netscape.com/eng/ssl3/draft302.txt) is presently the de facto industry standard for Web security. It is common for E-commerce applications which are based on the Web to employ the SSL protocol which is built into almost all Web servers and browsers, such as Netscape Enterprise Server, Microsoft Web Server, Netscape Communicator, and Microsoft Internet Explorer (IE).

The SSL protocol uses public key cryptography in conjunction with an X.509 certificate to provide server authentication and, optionally, client authentication. During the authentication process, the server sends its X.509 certificate chain which may or may not contain the root CA certificate to the client as part of the handshake messages the client and server exchange at the start of a session. The client validates the server's certificate through a normal certificate verification procedure if it has the server's certificate, it has the certification authority's (CA) certificate that signed the server's certificate, and it has associated trust information.

While SSL protocol provides for a secure way to transfer data, it currently restricts the way in which data can be transmitted. Currently, once the client and server establish a connection over SSL, it precludes other technology from acting on the data, e.g., terminating the SSL connection, further processing the de-encrypted data and then compressing the data, since the CA certificate from which the original SSL session was established with would be lost in so doing.

Accordingly, the data is unable to be accelerated through advanced compression technology. Rather, the data must be passed along without intervention. It is paramount to preserve the integrity of SSL protocol meaning that a private key on the server never be passed over the connection, rather only the public key be transmitted.

There remains therefore a need in the industry to accelerate data transfer using the SSL protocol. There also is a need to present the client with a proper CA certificate in order to assure a validated SSL protocol when performing acceleration or increasing data access over a SSL network environment.

BRIEF SUMMARY OF THE INVENTION

It is an object to accelerate data transfer using SSL protocol.

It is another object to maintain a proper CA certificate in order to assure verified SSL protocol when performing acceleration or increasing data access over a SSL network environment.

It is another object to securely project the CA certificate over a SSL connection while employing data acceleration technology.

It is an object to provide a system for increasing data transfer over a SSL network environment.

Accordingly, the present invention is directed to a method and system for increasing data access in a secure socket layer network environment. The system includes a web server computer having SSL protocol server software operably associated therewith for enabling a SSL connection, wherein SSL protocol server software includes a CA certificate and private key, a client computer communicatively linked to the web server computer and has web browser software which includes SSL protocol client software operably associated with the web server for enabling an SSL connection between the client and the web server, and means to verify CA certificate.

SSL acceleration client software is operably disposed on the client computer for monitoring when the web browser requests a SSL connection with the web server. The SSL acceleration client software intercepts the SSL request from the web browser and uses an established SSL connection or initiates another SSL request to the SSL acceleration server computer to establish a SSL connection.

SSL acceleration server software is operably associated with the web server computer for communicating with the SSL acceleration client software and also monitoring when the web server computer receives a request for a SSL connection through SSL acceleration client software. The SSL acceleration server software is operably associated with the SSL protocol server software to obtain a pseudo CA certificate and access to the private key.

Upon detection of the SSL connection request from the web browser software by the SSL acceleration client software, this initiates a SSL handshake between the SSL acceleration client and the SSL acceleration server wherein the pseudo CA certificate is sent to the SSL acceleration client software which includes a public key. The SSL acceleration client then presents the pseudo CA certificate to the web browser for validation.

Web browser software sends a list of available encryption algorithms (ciphers) back through SSL acceleration client software. The SSL acceleration client software sends a chosen cipher to the browser software. The browser software creates a secret key, encrypts this using chosen cipher and using the previously received public key and sends the encrypted secret key to the SSL acceleration server software through the SSL acceleration client, where SSL acceleration server software de-encrypts the secret key using the copy of the private key and then returns the de-encrypted secret key back to the SSL acceleration client over the existing SSL session between SSL acceleration client and SSL acceleration server. The SSL acceleration client then uses the de-encrypted secret key to complete the SSL handshake between the SSL acceleration client and the web browser software. Once the "handshake" is completed and secure communications between the client computer's web browser and SSL acceleration client software can take place which in turn can communicate with the SSL acceleration server employing advanced acceleration techniques.

More particularly, the invention is directed to a system for increasing data access in a secure socket layer network environment. The system includes a web server computer having SSL protocol server software operably associated therewith for enabling a SSL connection, wherein SSL protocol server software includes a CA certificate and private key, SSL acceleration server software operably associated with the web server computer which includes a pseudo CA certificate and access to the private key and a public key. A client computer is communicatively linked to the web server computer having web browser software having SSL protocol client software operably associated therewith for enabling a first SSL connection between the client computer and the web server computer, SSL acceleration client software operably associated with the client computer which communicates with the SSL acceleration server software to receive a copy of the pseudo CA certificate and the public key and present the pseudo CA certificate to the web browser software for validation thereof for enabling a second SSL connection between the client computer and the web server computer in a manner which permits optimization techniques to be applied on data transmitted through the second SSL connection.

Other objects and advantages will be readily apparent to those skilled in the art upon viewing the drawings and reading the detailed description hereafter.

DETAILED DESCRIPTION OF THE INVENTION

Figure 1A:
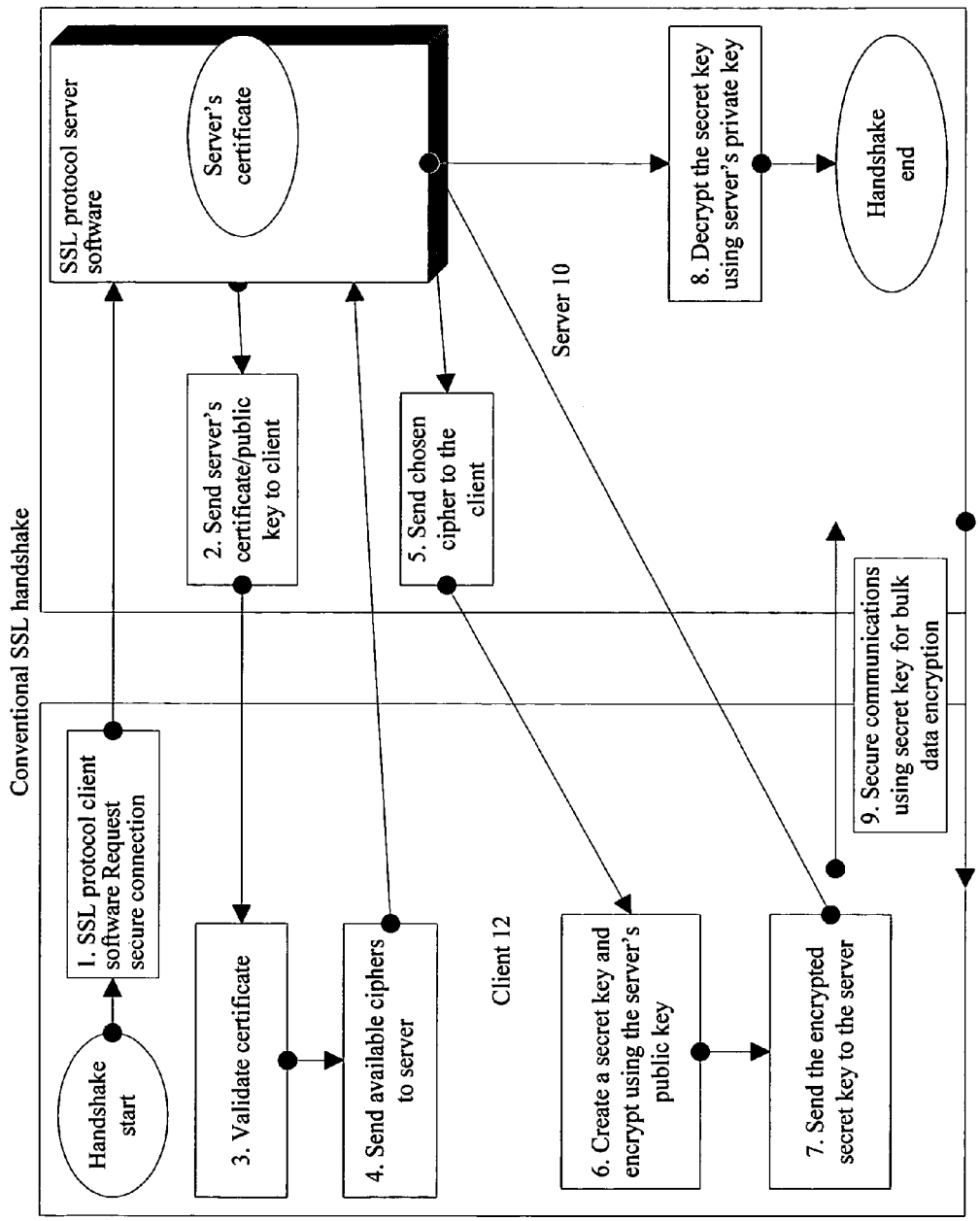
FIG. 1A is an illustration of the state of the art for SSL data transfer.
Figure 1B:
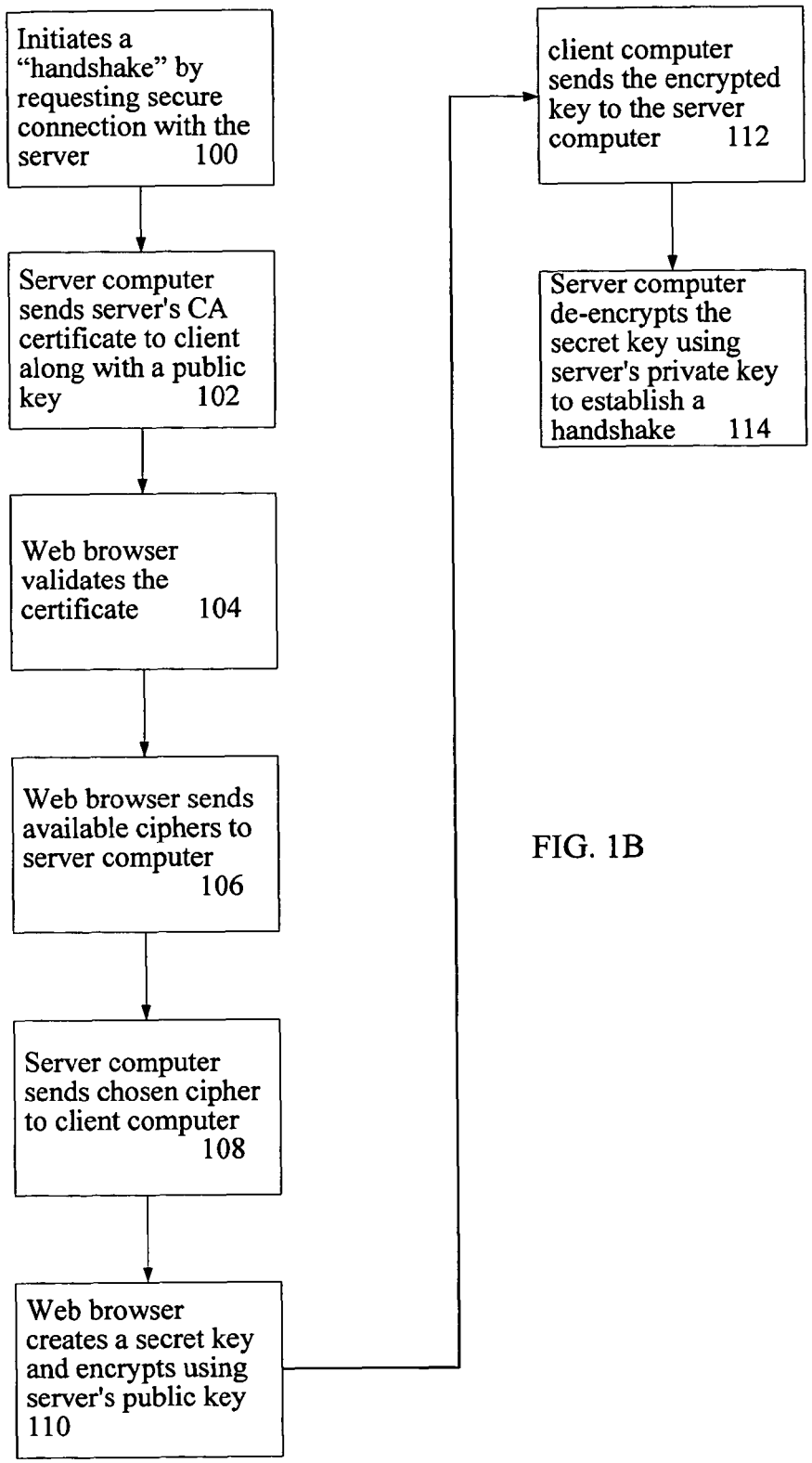
FIG. 1B is a flow chart showing the state of the art.

Referring now to the drawings, FIGS. 1A and 1B depict and the current state of the art. FIG. 1A depicts a web server computer 10 and a client computer 12. Conventionally, a "handshake" connection using SSL is performed as follows. The web server computer 10 is understood to include an operating system/software, server software, memory and linking devices as is known in the art. The web server computer 10 also has SSL protocol server software operably disposed thereon for enabling a SSL connection, wherein SSL protocol server software includes a CA certificate and private key for a particular owner/issuer. The client computer 12 likewise includes an operating system/software, web browser software having SSL protocol client software operably disposed thereon for enabling a SSL connection, memory and linking devices as is known in the art and is communicatively linked to the web server computer 10.

In this way, the steps shown in FIG. 1B can be performed. The client computer 12 initiates 100 a "handshake" by requesting secure connection with the server computer 10. The server computer 10 sends 102 server's CA certificate to client computer 12 along with a public key.

The web browser validates 104 the CA certificate. Web browser sends 106 available ciphers to server computer 10. The server computer 10 sends 108 chosen cipher to client computer 12. Web browser creates 110 a secret key and encrypts using server's public key. The client computer 12 sends 112 the encrypted secret key to the server computer 10. Server computer 10 de-encrypts 114 the secret key using server's private key to establish a handshake. Thus, a secure communication link is established through which communication can take place.

Figure 2A:
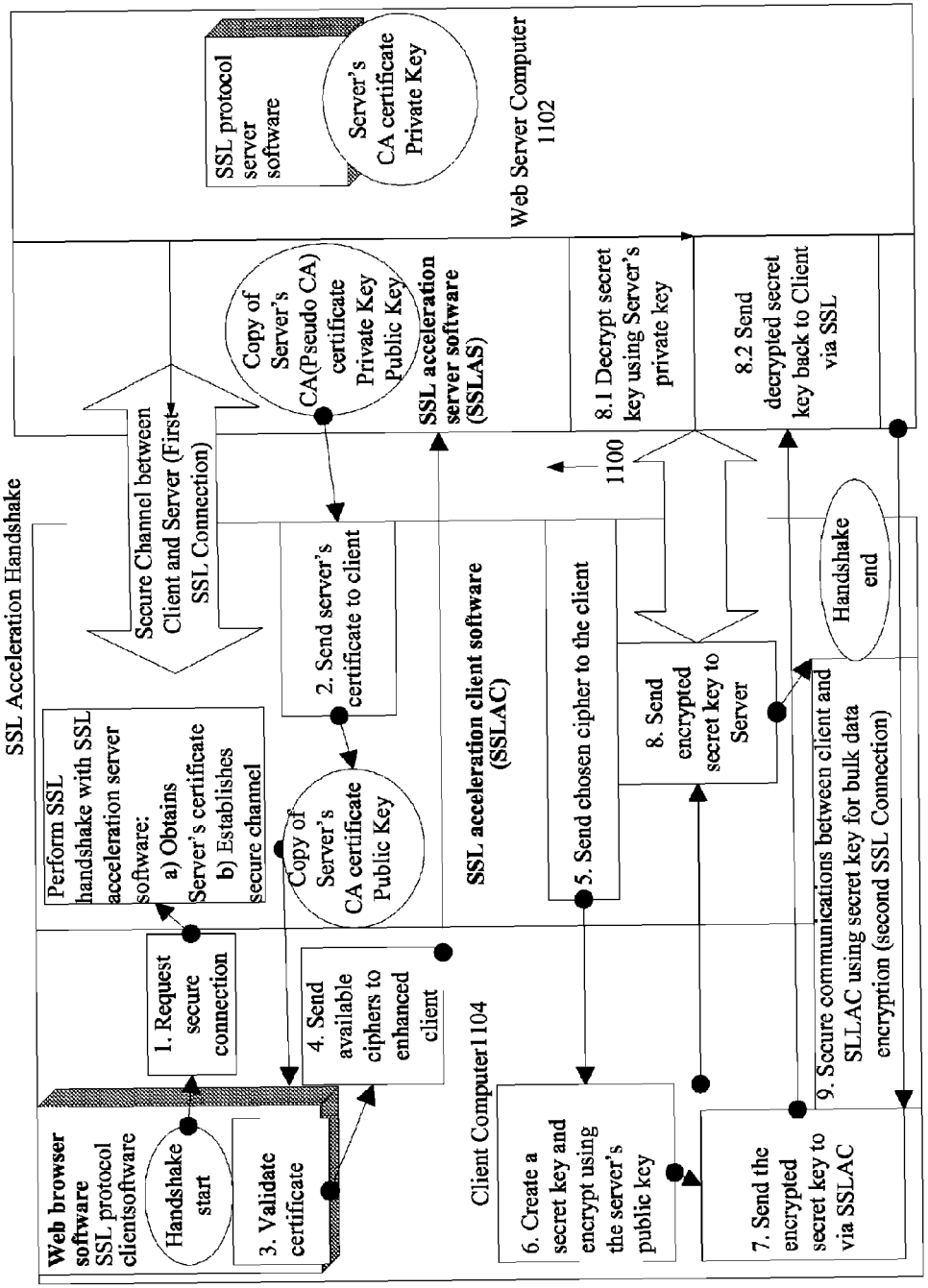
FIG. 2A is an illustration of a SSL data transfer using the present invention.
Figure 2B:
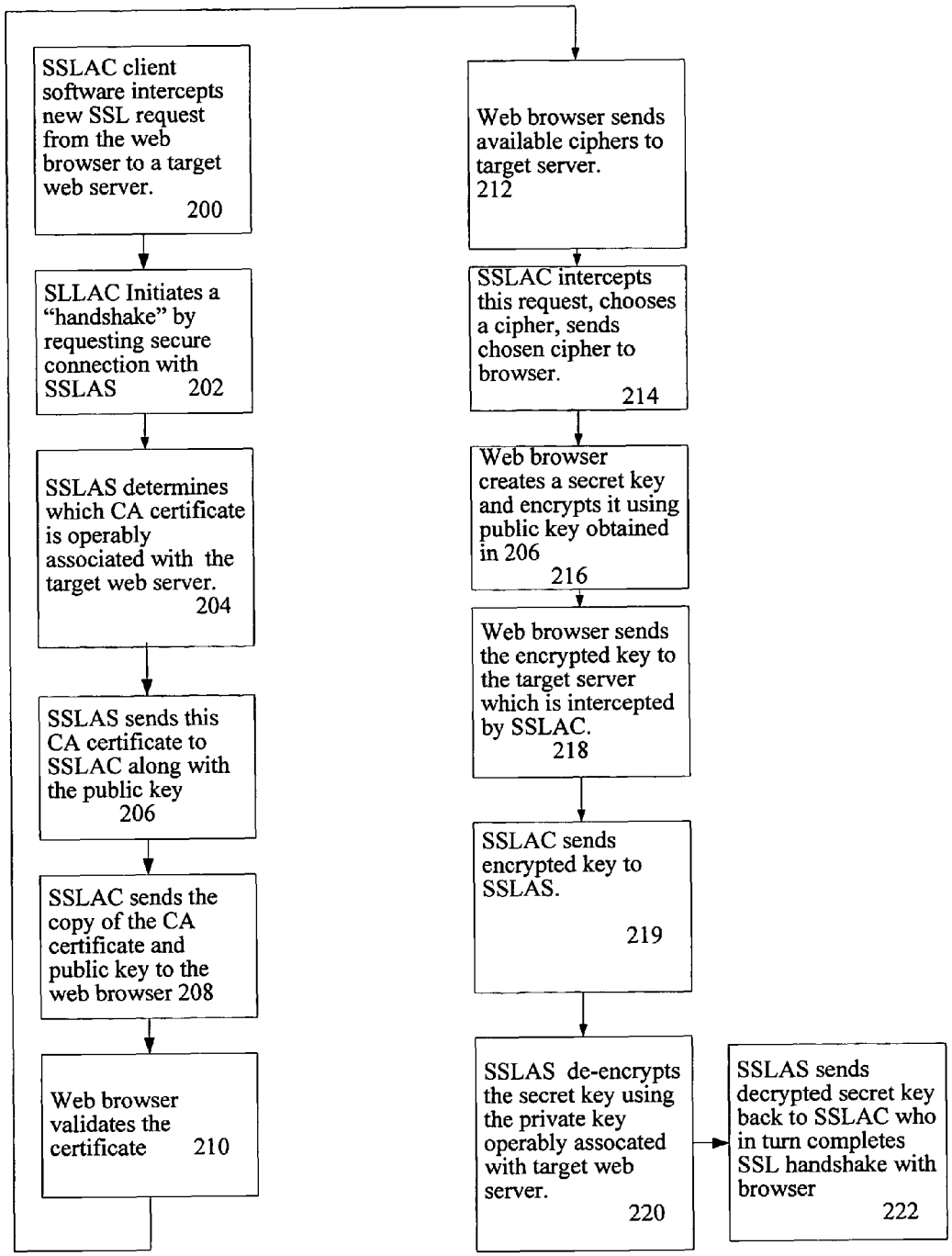
FIG. 2B is a flow chart employing the invention.

The present invention is generally depicted in FIGS. 2A and 2B and is directed to a system and method for increasing data access in a secure socket layer network environment and is generally designated by the number 1100. The system 1100 includes a web server computer 1102 which has an operating system/software, server software, memory and linking devices as is known in the art. Further, the computer 1102 has SSL protocol server software operably disposed thereon for enabling a SSL connection, wherein SSL protocol server software includes a CA certificate and private key.

A client computer 1104 includes an operating system/software, web browser software having SSL protocol client software operably disposed thereon for enabling a SSL connection, memory and linking devices as is known in the art and is communicatively linked to the web server computer 1102. SSL acceleration client (SSLAC) software is operably disposed on the client computer 1104 for monitoring when the web browser requests a SSL connection with the web server 1102.

SSL acceleration server (SSLAS) software is operably disposed on the web server computer 1104 for receiving a request for a SSL connection through SSL acceleration client software. The SSL acceleration server software is operably associated with the SSL protocol server software to obtain one either a copy or an equal credential of the CA certificate (i.e., a pseudo CA certificate) and private key.

The operation of the invention can be understood from steps shown in FIGS. 2A and 2B. SSL acceleration client software intercepts 200 new SSL request for a SSL secure connection from the web browser to a target web server. The SSL acceleration client software then initiates 202 a SSL handshake with the SSLAS operably associated with the target web server computer and to start SSL connection. By virtue of the foregoing, a first SSL connection is established between the client and the web server. The SSLAS then determines 204 which CA certificate is operably associated with the target web server. As part of the SSL handshake between SSLAC and SSLAS, the SSLAS sends 206 this CA certificate to SSLAC along with a public key. At this point a secure SSL session is established between SSLAC and SSLAS and all subsequent data traffic between SSLAC and SSLAS flows over this secure connection. The SSLAC software sends 208 the copy of the CA certificate to the web browser for validation 210. Web browser software sends 212 a list of available encryption algorithms (ciphers) back to target web server (i.e., server computer 1102). SSLAC software intercepts this from the browser and sends 214 a chosen cipher to the browser software. The web browser software creates 216 a secret key, encrypts using chosen cipher and using the previously received public key and sends 218 the encrypted secret key to the target server, which is intercepted and sent 219 through the SSL acceleration client software to the SSLAS software. SSLAS software de-encrypts 220 the secret key using the private key operably associated with the target server. SSLAS software sends 222 decrypted secret key back to SSLAS software via the secure SSL connection, wherein a "handshake" is completed and secure communications between the client computer's web browser and SSLAS software and by using the secret key, data can be accelerated between the client computer 1104 and the web server computer 1102 employing acceleration software, such as compression software of the SSL acceleration client/server software.

Because the SSL connection is terminated by SSLAC, SSLAC can process the data in unencrypted form allowing it to apply data compression and other optimization techniques to the data stream. By virtue of the foregoing, a second SSL connection is established between the client and web server in a manner which permits optimization techniques to be applied through the second SSL connection. This is done in such a way that the credentials of the SSLAS are presented to the web browser without having violated the SSL paradigm because the private key of the SSLAS was never transmitted to SSLAC.

The above described embodiment is set forth by way of example and is not for the purpose of limiting the present invention. It will be readily apparent to those skilled in the art that obvious modifications, derivations and variations can be made to the embodiments without departing from the scope of the invention. For example, SSLAS does not need to reside on the web server, but it is contemplated that SSLAS will be remotely located on another computer interacting with the web server computer; or where SSLAC is running on a different computer than browser and can whose services can be shared concurrently by multiple browsers. Accordingly, the claims appended hereto should be read in their full scope including any such modifications, derivations and variations.

What is claimed is:

1. A system for increasing data access in a secure socket layer network environment, which includes:
   a web server computer, comprising hardware, having SSL protocol server software operably associated therewith for enabling a first SSL connection, wherein SSL protocol server software includes a CA certificate and private key, SSL acceleration server software operably associated with said web server computer which includes a pseudo CA certificate and access to said private key and a public key; and
   a client computer, comprising hardware, communicatively linked to said web server computer having web browser software having SSL protocol client software operably disposed thereon for enabling said first SSL connection between said client computer and said web server, wherein said first SSL connection is established between said web browser software and SSL acceleration client software operably disposed thereon said client computer, wherein said SSL acceleration client software communicates with said SSL acceleration server software to receive a copy of said pseudo CA certificate and said public key and present said pseudo CA certificate to said web browser software for validation thereof for enabling a second SSL connection with said first SSL connection between said client computer and said web server computer, wherein said second SSL connection is established between said SSL acceleration client software and said SSL acceleration server software in a manner wherein said private key is never transmitted to the SSL acceleration client software on said client computer and which permits optimization techniques to be applied on data transmitted through said second SSL connection.

2. The system of claim 1, wherein said SSL acceleration client software is further equipped for monitoring when said web browser requests said first SSL connection with said web server computer and intercepting said SSL request from said web browser, and diverting communication through said second SSL connection.

3. The system of claim 1, which includes compression software for transmitting data secure communications between said client computer and said web server computer over said second SSL connection.

4. A method for increasing data access in a secure socket layer network environment, which includes the steps of:
   employing a web server computer having SSL protocol server software operably associated therewith for enabling a first SSL connection, wherein SSL protocol server software includes a CA certificate and private key, SSL acceleration server software operably associated with said web server computer which includes a pseudo CA certificate and access to said private key and a public key; and
   employing a client computer communicatively linked to said web server computer having web browser software having SSL protocol client software operably disposed thereon for enabling said first SSL connection between said client and said web server, wherein said first SSL connection is established between said web browser software and SSL acceleration client software operably disposed thereon said client computer, wherein said SSL acceleration client software communicates with said SSL acceleration server software to receive a copy of said pseudo CA certificate and said public key and present said pseudo CA certificate to said web browser software through SSL acceleration server software for validation thereof for enabling a second SSL connection with said first SSL connection between said client computer and said web server computer, wherein said second SSL connection is established between said SSL acceleration client software and said SSL acceleration server software in a manner wherein said private key is never transmitted to the SSL acceleration client software on said client computer and which permits optimization techniques to be applied on data transmitted through said second SSL connection.

5. The method of claim 4, wherein said SSL acceleration monitors when said web browser requests said first SSL connection with said web server computer and intercepts said SSL request from said web browser, and diverts communication through said second SSL connection.

6. The method of claim 4, which includes employing compression software for transmitting data secure communications between said client computer and said web server computer over said second SSL connection.

7. A system for increasing data access in a secure socket layer network environment, which includes:
   a web server computer, comprising hardware, having SSL protocol server software operably associated therewith for enabling a first SSL connection, wherein SSL protocol server software includes a CA certificate and private key, SSL acceleration server software operably associated with said web server computer which includes a pseudo CA certificate and access to said private key and a public key; and
   a second computer, comprising hardware, communicatively linked to said web server computer operably associated with web browser software having SSL protocol client software operably disposed thereon for enabling said first SSL connection between a client computer and said web server, wherein said first SSL connection is established between said web browser software and SSL acceleration client software operably disposed thereon said second computer, wherein said SSL acceleration client software communicates with said SSL acceleration server software to receive a copy of said pseudo CA certificate and said public key and present said pseudo CA certificate to said web browser software for validation thereof for enabling a second SSL connection with said first SSL connection between said client computer and said web server computer, wherein said second SSL connection is established between said SSL acceleration client software and said SSL acceleration server software in a manner wherein said private key is never transmitted to said SSL acceleration client software and which permits optimization techniques to be applied on data transmitted through said second SSL connection.

8. The system of claim 7, wherein said SSL acceleration client software is further equipped for monitoring when said web browser requests said first SSL connection with said web server computer and intercepting said SSL request from said web browser, and diverting communication through said second SSL connection.

9. The system of claim 7, which includes compression software for transmitting data secure communications between said client computer and said web server computer over said second SSL connection.

* * * * *